United States Patent [19]
Shijo et al.

[11] Patent Number: 5,926,965
[45] Date of Patent: Jul. 27, 1999

[54] TILT SENSOR AND TOP COVER PLATE THEREOF

[75] Inventors: Yoshihisa Shijo; Takanobu Shiokawa; Hiroshi Sone, all of Tokyo, Japan

[73] Assignee: Asahi Kogaku Kogyo Kabushiki Kaisha, Tokyo, Japan

[21] Appl. No.: 08/897,688

[22] Filed: Jul. 21, 1997

[30] Foreign Application Priority Data

Jul. 26, 1996 [JP] Japan .................................. 8-197839

[51] Int. Cl.⁶ .............................................. G01C 9/36
[52] U.S. Cl. .............................................. 33/390; 33/379
[58] Field of Search ............................. 33/377, 379, 384, 33/390, 679.1, 366.22

[56] References Cited

U.S. PATENT DOCUMENTS

| | | | |
|---|---|---|---|
| 666,843 | 1/1901 | Brownell | 33/390 |
| 988,637 | 4/1911 | Gràul | 33/390 |
| 1,898,367 | 2/1933 | Heinze | 33/390 |
| 2,806,296 | 9/1957 | Weichert | 33/390 |
| 3,061,920 | 11/1962 | Johnson | 33/390 |
| 3,164,023 | 1/1965 | Holderer | 33/390 |
| 3,487,303 | 12/1969 | Remington | 33/366.22 |
| 3,871,109 | 3/1975 | Vaida | 33/379 |
| 4,583,296 | 4/1986 | Dell'Acqua | 33/379 |
| 5,774,996 | 7/1998 | Ogawa et al. | 33/379 |

FOREIGN PATENT DOCUMENTS

| | | | |
|---|---|---|---|
| 662664 | 3/1929 | France | 33/390 |
| 2564580 | 11/1985 | France | 33/390 |
| 745774 | 5/1944 | Germany | 33/390 |
| 1952869 | 4/1971 | Germany | 33/390 |
| 8105834 | 4/1997 | Japan . | |
| 359294 | 2/1962 | Switzerland | 33/390 |

*Primary Examiner*—G. Bradley Bennett
*Attorney, Agent, or Firm*—Greenblum & Bernstein, P.L.C.

[57] ABSTRACT

A tilt sensor includes a sealed container formed of a container body, a top cover plate adapted to close the container body and provided on one end surface thereof with a recess having a concave surface whose depth gradually increases from a peripheral edge toward a center thereof. The tilt sensor further includes a liquid enclosure containing an air bubble, that is enclosed in the container body. To coincide the center of the configuration of the top cover plate with a line normal at a deepest portion of the concave surface at a grinding operation after molding the top cover plate, an indicia is provided on the line normal to the concave surface at the deepest point of the concave surface.

20 Claims, 11 Drawing Sheets

TILT SENSOR AND TOP COVER PLATE THEREOF

BACKGROUND OF THE INVENTION

1. Field of the Invention

The present invention relates to a tilt sensor (tiltmeter) provided with a sealed container which is comprised of a container body and a top cover plate (upper end plate) which closes the container body and is provided with a recess whose depth gradually increases from the peripheral portion thereof toward the center portion, and a liquid enclosure containing therein an air bubble, which is enclosed in the container body.

2. Description of the Related Art

In general, a tilt sensor is provided in survey instruments, aircraft, or automobiles, etc., to measure the tilt angle thereof. The tilt sensor includes a sealed container which is comprised of, for example, a top cover plate in the form of a circular disc which is provided with a recessed surface, a circular bottom plate, and a cylindrical body. The cylindrical body is closed at the upper and lower open ends thereof by the top cover plate and the bottom plate, respectively. The position of an air bubble contained in a liquid enclosed in the sealed container is electrically detected.

To facilitate the mounting operation of the top cover plate and the bottom plate to the cylindrical body, the top cover plate, the bottom plate, and the cylindrical body are circular in a plan view, so that, upon the mounting operation, the axis of the top cover plate and the bottom plate can be easily aligned with the axis of the cylindrical body with reference to the configuration (outer shape) of the three elements.

The top cover plate is provided on one surface thereof with a recess formed, for example, by a part of a spherical surface. The recess permits an air bubble contained in a liquid enclosed in the sealed container to move in accordance with the inclination of the container body. The recess is constructed so that when the top cover plate is coaxially connected to the cylindrical body, the line normal to the recess at the deepest portion thereof is identical to the center of the configuration of the top cover plate, that is, the outer peripheral edge of the recess concurs with the inner peripheral edge of the cylindrical body.

The top cover plate can be made of a glass mold. In case of a top cover plate of a glass mold, the center of the configuration of the top cover plate may deviate from the normal line (axis) at the deepest portion of the recess, depending on the precision of the molding dies. In this connection, if the top cover plate whose center of configuration is not located at the deepest point of the recess is mounted to the cylindrical body with reference to the configuration of the top cover plate and the cylindrical body, a slight gap or clearance may be produced between the top cover plate and the cylindrical body. Consequently, the outer periphery of the top cover plate must be ground to make the center of the configuration of the top cover plate coincident with the normal line at the deepest point of the recess. This operation will be referred to hereinafter as a centering operation (grinding operation). The centering operation is carried out by grinding the outer peripheral edge of the top cover plate while rotating the top cover plate about the normal line at the deepest point of the recess, as in the grinding operation of an optical lens. To this end, it is necessary to align the center (axis) of rotation of the top cover plate with the normal line at the deepest point of the recess thereof (referred to as an aligning operation), prior to the centering operation, as in the case of an optical lens.

In the machining of an optical lens, the aligning operation is carried out by a bell chuck (bell clamp) system or a center detection method using a laser beam. The bell chuck system refers to a clamping system of a lens using cylindrical bell chucks which movably hold opposite surfaces of the lens, wherein the relative sliding movement between the lens and the bell chuck along a spherical surface of the lens takes place, so that the lens can be firmly held in a stable position in which the entire periphery of each end edge of the bell chuck comes into contact with the corresponding surfaces of the lens. The center detection method using a laser beam refers to a detection method in which the lens held by, for example, the bell chuck system is illuminated with the laser beam, so that the center of the lens can de detected in accordance with the light transmitted through or reflected by the lens.

However, the bell chuck system or the center detection method using the laser beam, as mentioned above cannot be properly used for the aligning operation of the top cover plate. Namely, in the aligning operation by the bell chuck system, it is necessary to slide the top cover plate relative to the bell chuck while bringing one front end edge of the bell chuck into contact with the recess of the top cover plate. However, since the recess of the top cover plate is usually defined by an optically rough surface, no smooth sliding movement of the top cover plate occurs. Moreover, if the recess of the top cover plate is defined by a toroidal surface, an end edge of the bell chuck is always in partial contact with the recess of the top cover plate, and hence no smooth movement (sliding movement) of the top cover plate takes place whatever the curvature of the recess is.

Furthermore, center detection methods can not be used for the aligning operation of the top cover plate, since the laser beam cannot be transmitted through the recess of the top cover plate made of a rough surface.

Under these circumstances, in the prior art, the aligning operation of the top cover plate must rely upon the measurement with the operator's eyes, which is time consuming and troublesome.

SUMMARY OF THE INVENTION

An object of the present invention is to provide a tilt sensor in which the centering operation of the top cover plate can be easily carried out.

To achieve the object mentioned above, according to an aspect of the present invention, there is provided a tilt sensor including a sealed container comprising a container body, a top cover plate which is adapted to close the container body and is provided on one end surface thereof with a concave surface whose depth gradually increases from the peripheral edge toward the center thereof, and a liquid enclosure containing an air bubble, enclosed in the container body wherein provision is made of an indicia provided on a line normal to the concave surface at the deepest point thereof. The position of the indicia does not change when the top cover plate is rotated about a line normal to the concave surface at the deepest point thereof.

With this arrangement, the centering operation of the top cover plate of the sealed container which constitutes a tilt sensor (tiltmeter) can be easily carried out by making the indicia located on the normal line to the concave surface at the deepest point of the concave surface coincident with the center of rotation of the top cover plate.

According to another aspect of the present invention, there is provided a top cover plate which is provided with a plurality of indicia which are radially spaced from the deepest point of the concave surface at an equal distance that does not change when the top cover plate is rotated about a line normal to the concave surface.

With this arrangement, the centering operation of the sealed container which constitutes a tilt sensor (tiltmeter) can be easily carried out as with the first aspect of the present invention.

The present disclosure relates to subject matter contained in Japanese Patent Application No. 08-197839 (filed on Jul. 26, 1996) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Embodiment 1

Mechanical Structure of Tiltmeter

Figure 1:
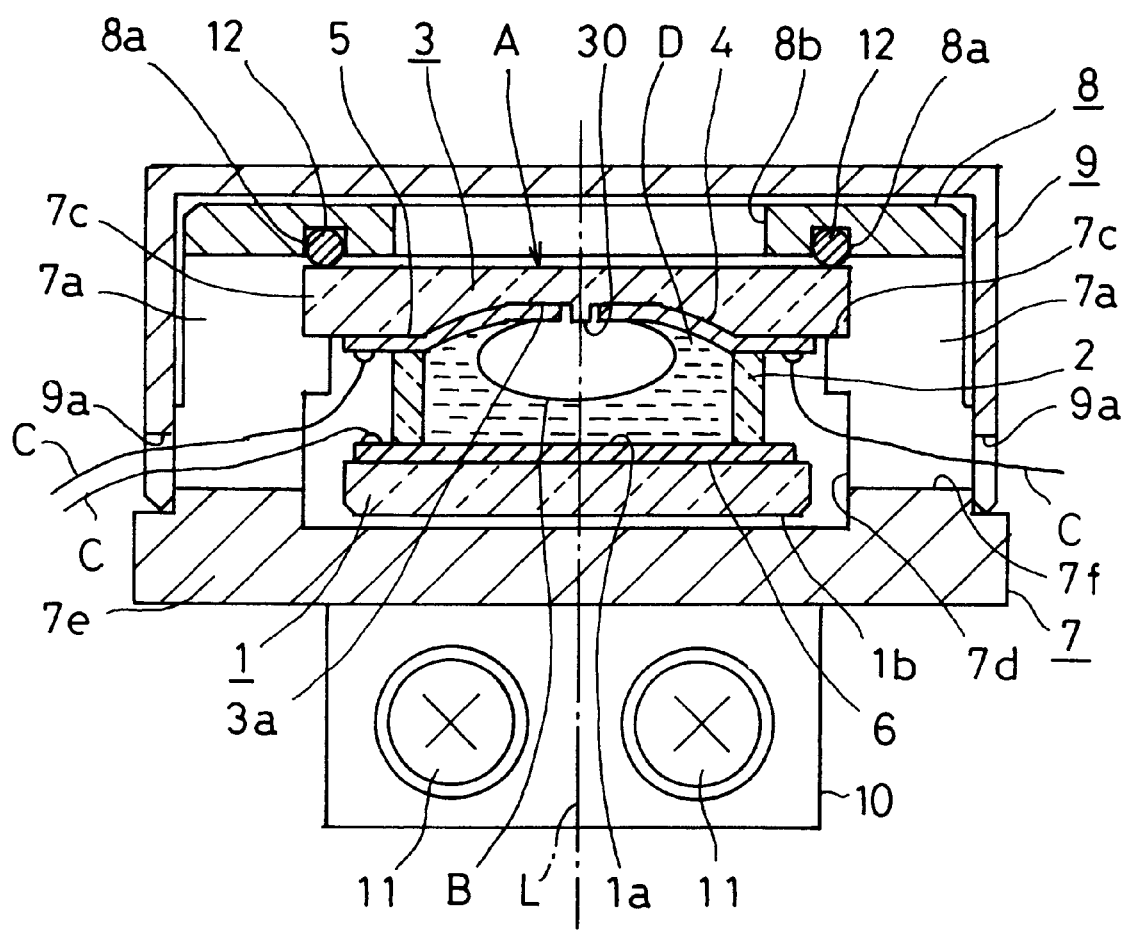
FIG. 1 is a sectional view of a tilt sensor taken along the line I—I in FIG. 3, according to a first embodiment of the present invention.
Figure 2:
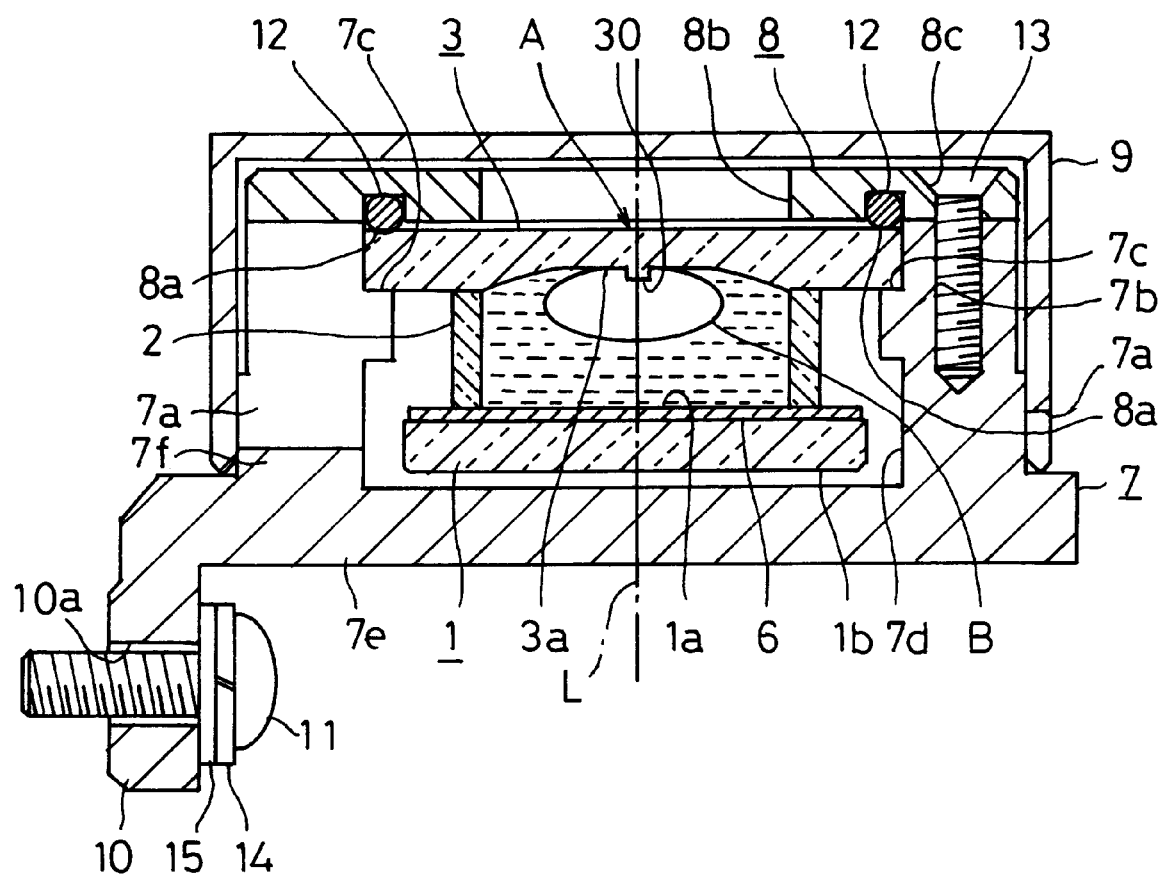
FIG. 2 is a sectional view of a tilt sensor taken along the line II—II in FIG. 3, according to an embodiment of the present invention.
Figure 3:
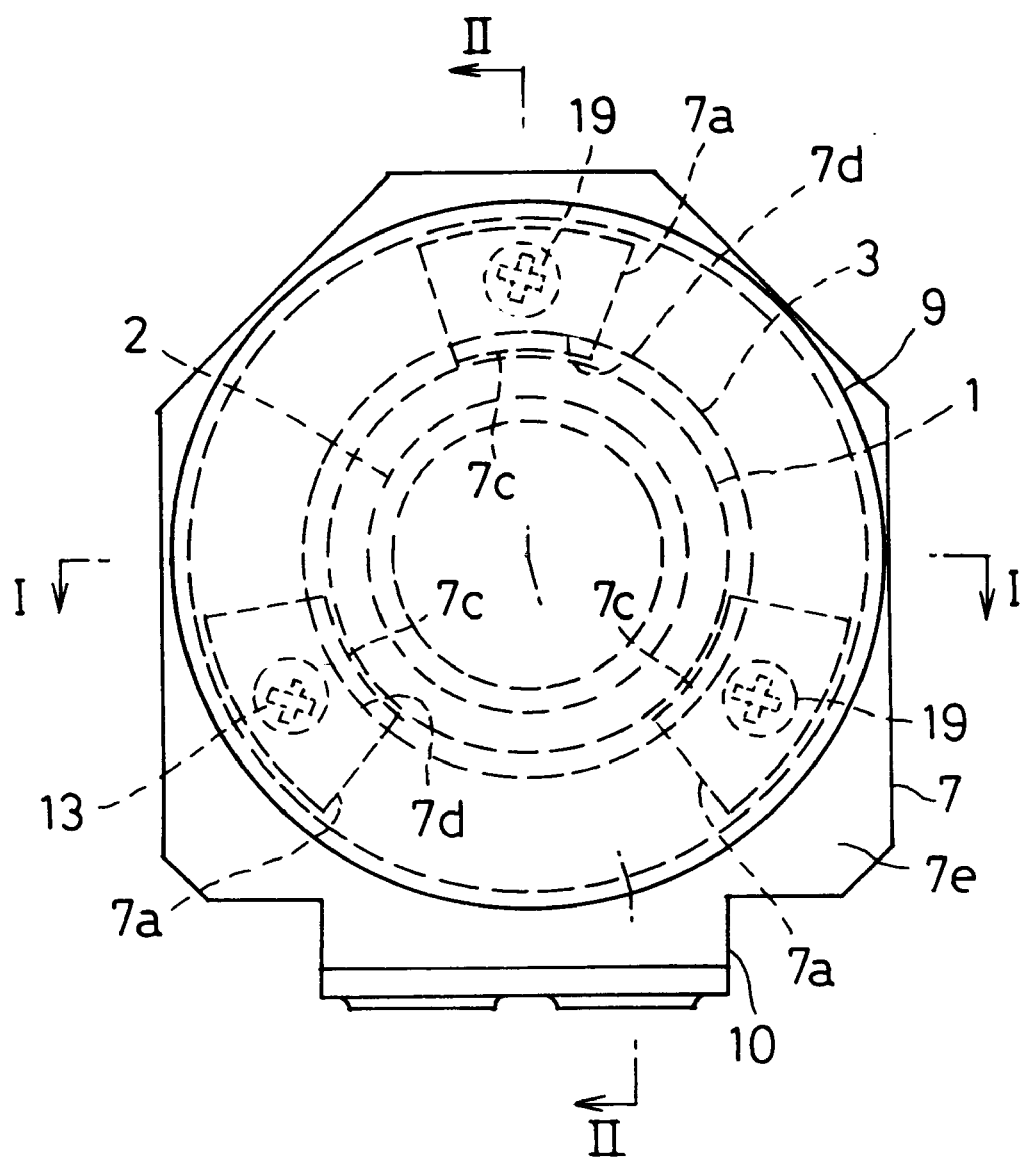
FIG. 3 is a top view of a tilt sensor shown in FIG. 1.

As can be seen in FIGS. 1 through 3, a tilt sensor is composed of a sealed container "A", a holder 7 which holds therein the sealed container "A", a lid 8 which closes the holder 7 and which presses the sealed container "A" against the holder 7, and a cover 9 which covers the holder 7 and the lid 8. These elements will be discussed below.

Sealed Container

The sealed container "A" is comprised of a cylindrical body 2, a top cover plate (upper end plate) 3 and a bottom plate 1, secured to the upper and lower ends of the cylindrical body 2, respectively. The cylindrical body 2, the top cover plate 3 and the bottom plate 1 are made of a highly insulating material such as lead glass and are adhered by means of an adhesive such as a glass paste in a liquid tight fashion.

Figure 4A:
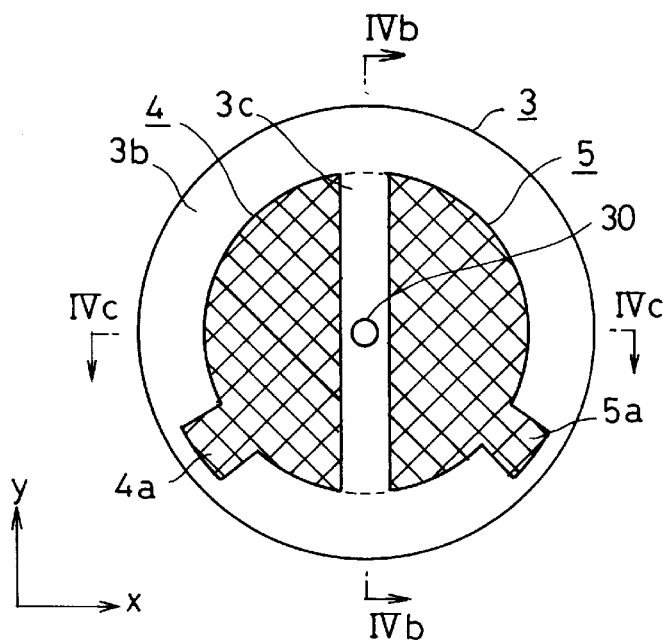
FIGS. 4a, 4b and 4c are a plan view of a top cover plate shown in FIG. 1, a sectional view taken along the line IVb—IVb in FIG. 4a and a sectional view taken along the line IVc—IVc in FIG. 4a, respectively.
Figure 4B:
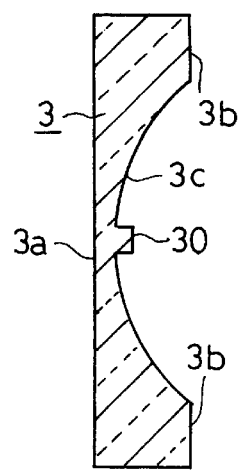
Figure 4C:
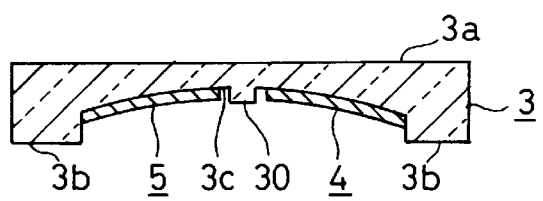

As can be seen in FIGS. 4a through 4c, the top cover plate 3 is made of a transparent disc provided with a planar upper surface 3a and a lower surface 3b which is provided on the center portion thereof with a recess (concave surface) 3c whose depth gradually increases toward the center thereof from the peripheral portion. The peripheral edge of the top cover plate in a plan view defines a circle whose diameter is for example 22 mm.

The recess (concave surface) 3c of the top cover plate 3 is defined by a toroidal surface having different curvatures in the direction x in which the tilt angle is detected and the direction y perpendicular to the detection direction x. The curvature in the detection direction x is relatively small so as to enhance the precision in the detection of the tilt angle, as shown in FIG. 4c. The curvature in the direction y is larger than the curvature in the direction x so as to prevent the air bubble "B" from sticking to the inner surface of the cylindrical body 2 if the mounting angle in the direction perpendicular to the detection direction x is slightly different from a predetermined value, as shown in FIG. 4b. For example, the curvatures in the directions x and y are 300 mm and 60 mm, respectively.

The center of the curvature in the direction x is identical to the center of the curvature in the direction y, which is located on the deepest point of the recess 3c. The line normal to the recess 3c at the deepest point is identical to the center of the configuration of the top cover plate 3. The outer peripheral edge of the recess 3c is defined by a circle having a radius of, for example 6.3 mm whose center is located on the normal line at the deepest point of the recess 3c. The circle defined by the outer peripheral edge of the recess 3c is concentric to the circle defined by the outer peripheral edge of the top cover plate 3, as may be seen in FIG. 4a. There is a stepped portion in the directions x and y between the recess 3c and the lower surface 3b, as can be seen in FIG. 4b or 4c. A tangent plane tangential to the recess 3c at the deepest point thereof is parallel with the lower surface 3b of the top cover plate 3. The recess 3c is provided on the deepest portion thereof with an indicia 30 in the form of a cylindrical projection which projects toward the inside of the sealed container "A".

The top cover plate 3 is made of a glass mold using a glass preform whose inner surface has been ground by, for example, a #1000 abrasive or the like to have a rough surface with an appropriate roughness. The projection (indicia) 30 is integrally formed by the glass mold. Thus, both the lower surface 3b of the top cover plate 3 and the concave surface (recess) 3c are formed by rough surfaces. The recess 3c is provided thereon with first and second upper electrodes 4 and 5 which are made of a platinum thin layer. The first and second upper electrodes 4 and 5 are arranged in line-symmetry with respect to the line passing through the deepest point of the recess 3c and perpendicular to the sheet of the drawings (FIG. 1), i.e., the line extending in the direction y in FIG. 4a and are spaced from one another at a predetermined distance. The upper electrodes 4 and 5 spread over the entirety of the concave surface 3c except for the space provided between the first and second upper electrodes 4 and 5. Note that the first and second upper electrodes 4 and 5 are respectively provided, on the outer peripheral portions thereof, with sector protrusions 4a and 5a that are located out of the recess 3c and superimposed on the lower surface 3b of the top cover plate 3. The first and second upper electrodes 4 and 5 including the protrusions 4a and 5a are formed by depositing a platinum thin layer on the bottom surface 3b of the top cover plate 3 including the recess 3c by means of a high frequency sputtering, using a predetermined shape of mask which covers the portion of the bottom surface 3b other than the portion on which the first and second upper electrodes 4 and 5 including the protrusions 4a and 5a are to be formed. Upon assembling the sealed container "A", lead wires C are soldered to the peripheral portions of the sector protrusions 4a and 5a of the first and second upper electrodes 4 and 5 that are located on the outside of the cylindrical body 2.

Figure 5:
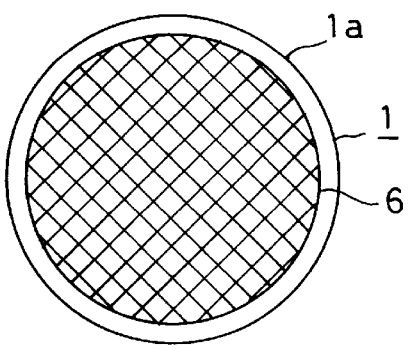
FIG. 5 is a plan view of a bottom plate shown in FIG. 1.

The bottom plate 1 is made of a transparent plate in the form of a disc, as may be seen in FIG. 5. Namely, the upper surface 1a and the lower surface 1b of the bottom plate 1 are parallel with each other. The upper surface 1a of the bottom plate 1 is made of a rough surface having an appropriate roughness, which is formed by grinding the surface using, for example, an approximately #1000 abrasive. The upper surface 1a of the bottom plate 1 constitutes a bottom surface of the sealed container "A" when the latter is assembled.

A lower electrode 6 is provided on the upper surface 1a of the bottom plate 1. The lower electrode 6 is in the form of a circle whose diameter is larger than the outer diameter of the cylindrical body 2 but slightly smaller than the outer diameter of the upper surface 1a. The lower electrode 6 is made of a thin platinum layer which is formed by depositing platinum onto the upper surface 1a by high-frequency sputtering. In the high-frequency sputtering, the portion of the upper surface 1a other than that corresponding to the electrode 6 is covered by a mask, as same as in the formation of the upper electrodes 4 and 5. Note that upon assembly of the sealed container "A", lead wires (not shown) are soldered to the circumferential portion of the lower electrode 6 that spreads out of the cylindrical body 2.

The cylindrical body 2 is made of a glass tube having a uniform thickness. The outer and inner diameters of the cylindrical body 2 are, for example, 15 mm and 12.6 mm, respectively. The upper and lower ends of the cylindrical body 2 are cut along planes perpendicular to the longitudinal axis thereof and are coaxially connected to lower surface 3b of the top cover plate 3 and the upper surface 1a of the bottom plate 1. In the illustrated embodiment, since the inner diameter of the cylindrical body 2 and the diameter of the outer peripheral edge of the recess 3c of the top cover plate 3 are identical to 12.6 mm, the inner surface of the cylindrical body 2 extends continuously with the outer edge of the recess 3c (stepped portion between the lower surface 3b and the recess 3c).

An electrolytic solution D containing an appropriate amount of air which produces an air bubble B is enclosed in the sealed container "A". The electrolyte D is, for example, a solution of methyl alcohol in which potassium iodide is dissolved. The air bubble B positions at the center of the recess 3c so long as the deepest point of the recess 3c is located at the highest position in the gravitational direction, i.e., the lower surface 3b of the top cover plate 3 lies in a horizontal plane. If the top cover plate 3 is inclined in the direction y in FIG. 4a, the air bubble B positions in the space provided between the first and second upper electrodes 4 and 5, provided that no is inclination of the top cover plate 3 occurs in the direction x.

Holder

The holder 7 is made of an aluminum alloy which is cut in a predetermined shape. As shown in FIG. 3, the holder 7 which is made of a block whose shape in a plan view is generally square is largely chamfered at the two adjacent corners thereof and is slightly chamfered at the other corners. The holder 7 is comprised of a bottom plate 7e and three identical upright support posts 7a whose cross sectional shape is sectoral and which are spaced from one another at an equi-angular distance. Moreover, there are projections 7f between the adjacent support posts 7a. The support posts 7a, the projections 7f and the bottom plate 7e define a substantially cylindrical hollow portion 7d having a closed lower end. Note that the cylindrical peripheral surface of the hollow portion 7d is defined by an imaginary circle on which the inner peripheral surfaces of the three support posts 7a are spaced at an equi-angular distance. The outer and inner peripheral surfaces of the three support posts 7a are defined by part of cylindrical surfaces having a center axis L. The support posts 7a are each provided on the inner peripheral surfaces thereof with a support flange 7c which projects toward the center of the hollow portion 7d. The support flanges 7c lie in a plane normal to the center axis L. The upper end portions of the outer peripheral surfaces of the support posts 7a are slightly reduced in diameter.

The inner diameter of the support flanges 7c is smaller than the outer diameter of the top cover plate 3 and is larger than the outer diameter of the bottom plate 1. The distance between the upper end surfaces of the support flanges 7c and the bottom plate 7e is larger than the distance between the lower surface 3b of the top cover plate 3 and the lower surface 1b of the bottom plate 1. The upper end surfaces of the support posts 7a lie in the same plane perpendicular to the central axis L and are provided with threaded holes 7b which extend in parallel with the axis L.

As can be seen in FIG. 3, the holder 7 is provided with a rectangular mounting portion 10 which projects from the side edge of the holder defined between the slightly chamfered corners. The mounting portion 10 is bent downward (i.e., in the gravitational direction) at right angles at the intermediate portion, as shown in FIG. 2. The front end (lower end) of the mounting portion 10 is provided with two through holes 10a in which securing bolts 11 are inserted to secure the tilt sensor to an object to be measured, as may be seen in FIG. 1. The inner diameter of the through holes 10a is larger than the outer diameter of the securing bolts 11, so that the tilt sensor can be rotated in the plane of the sheet of the drawing (FIG. 1) with respect to the object to be measured in order to adjust the inclination angle of the tilt sensor when the tilt sensor is mounted to the object.

Lid

The lid 8 is made of an aluminum alloy disc which is cut to have such a diameter that the outer peripheral surfaces of the upper ends of the three support posts 7a is circumscribed by a circle defined by the outer peripheral edge of the disc. The lid 8 put on the support posts 7a is provided with spot facing holes 8c corresponding to the threaded holes 7b of the support posts 7a, so that when screws 13 with flat heads are screwed in the threaded holes 7b, the screw heads can be inserted and seated on the spot facing holes 8c. The lid 8 is provided on the lower surface thereof with an annular groove 8a whose diameter is slightly smaller than the outer diameter of the top cover plate 3 and whose center is located on the axis L. An O-ring 12 is fitted in the annular groove 8a and is pressed against the top cover plate 3. The lid 8 is provided with a central opening 8b through which the air bubble B within the sealed container "A" can be viewed from the outside.

Cover

The cover 9 is made of an aluminum alloy which is cut into a bottomed cylinder whose one end is closed. The cover 9 is closely fitted onto the outer peripheral surfaces of the lower end portions of the support posts 7a without a clearance. The cover 9 prevents the sealed container "A" from being broken and from the entry foreign matter thereinto to serve as a dust-proof member. Note that the cover 9 is provided on the end edge thereof with cut-way portions 9a through which the lead wires C connected to the electrodes 4, 5, 6 extend to be connected to an external tilt angle detection circuit (not shown).

Formation of Top Cover Plate

The top cover plate 3 is made of a lead glass mold, as mentioned above. The recess 3c and the projection (indicia) 30 are integrally molded. Upon completion of the molding, the center of the configuration of the top cover plate 3 is generally deviated from the line normal to the concave surface (recess) 3c at the deepest point thereof. The centering operation is carried out to eliminate the deviation. Note that the aligning operation is effected to make the center of rotation of the top cover plate coincident with the normal line to the recess 3c at the deepest point thereof, prior to the centering operation, as mentioned above.

Figure 6:
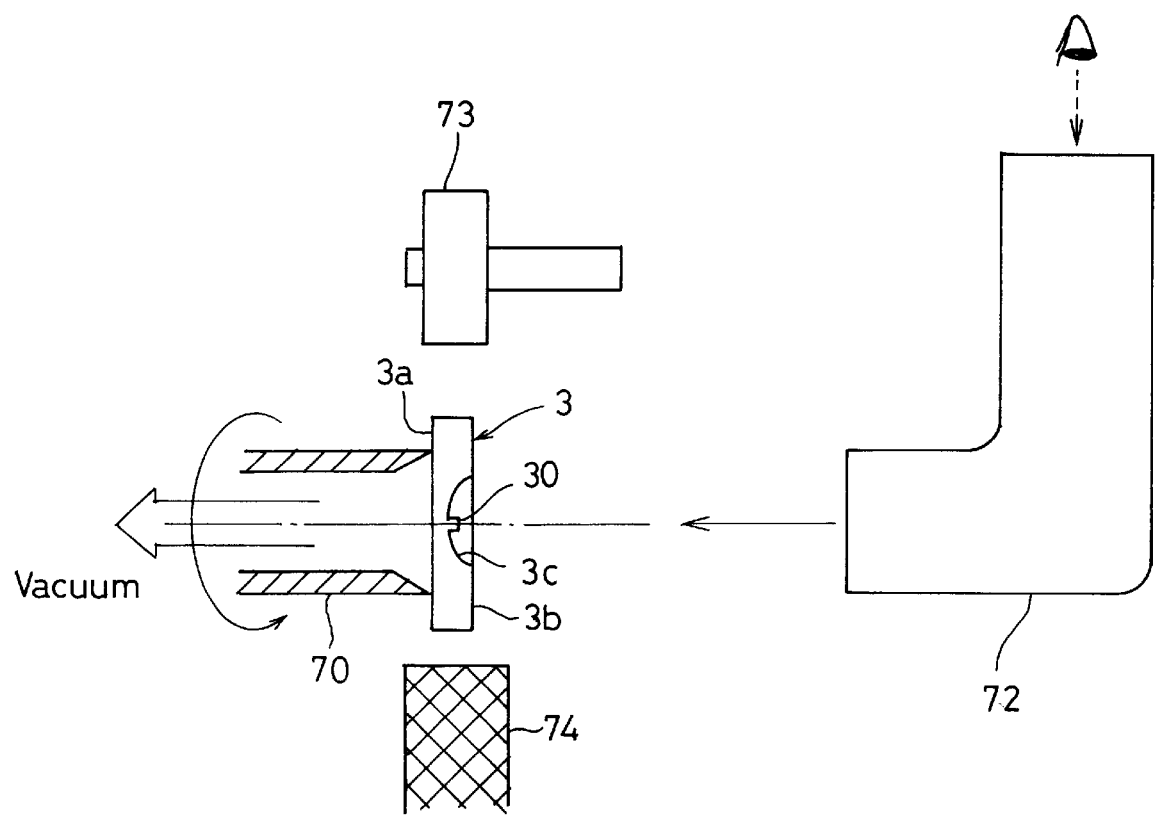
FIG. 6 is a conceptual view of a centering apparatus of a top cover plate shown in FIG. 1.

FIG. 6 schematically shows a centering apparatus. In FIG. 6, a cylindrical bell chuck 70 is connected at its base end to a spindle (not shown) so as to rotate about the longitudinal axis thereof. The inside of the bell chuck 70 is connected to a vacuum sucker (not shown), so that the upper surface 3a of the top cover plate 3 can be sucked onto the front end of the bell chuck by the vacuum. An aligning telescope 72 is opposed to the front end of the bell chuck 70. The axis of an objective lens of the telescope is aligned with the center axis (center of rotation) of the bell chuck 70. A grinding wheel 74 to grind the outer periphery of the top cover plate 3 has a peripheral surface parallel with the central axis of the bell chuck 70 and is movable in the direction perpendicular to the central axis of the bell chuck 70, towards or away from the top cover plate 3.

In the aligning operation using the apparatus, an operator actuates the vacuum sucker to suck the upper surface 3a of the top cover plate 3 onto the front end of the bell chuck 70 due to the vacuum. Thereafter, the spindle to which the bell chuck 70 is connected rotates the top cover plate 3 together with the bell chuck 70. The operator looks at the lower surface 3b of the rotating top cover plate 3 through the aligning telescope 72 to observe the state of the projection (indicia) 30. Alternatively, it is possible to use a video camera or the like, in place of the aligning telescope 72. In this alternative, the projection 30 is displayed on a display connected to the video camera, so that the operator can observe the state of the projection 30 through the display. Also, a microscope can be used for the aligning telescope 72.

Figure 7A:
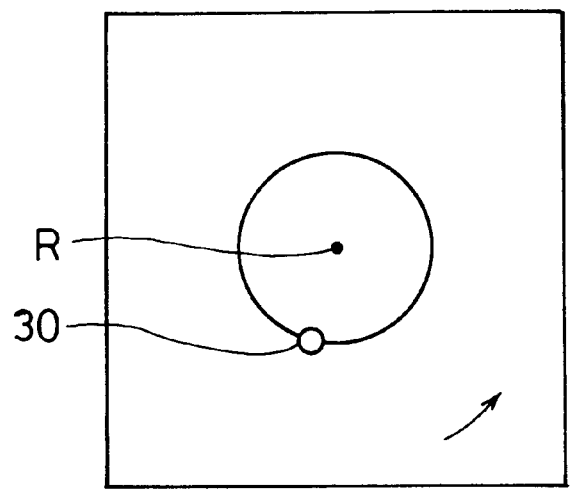
FIGS. 7a and 7b are schematic views showing two different positions of an indicia provided on a top cover plate shown in FIG. 1.
Figure 7B:
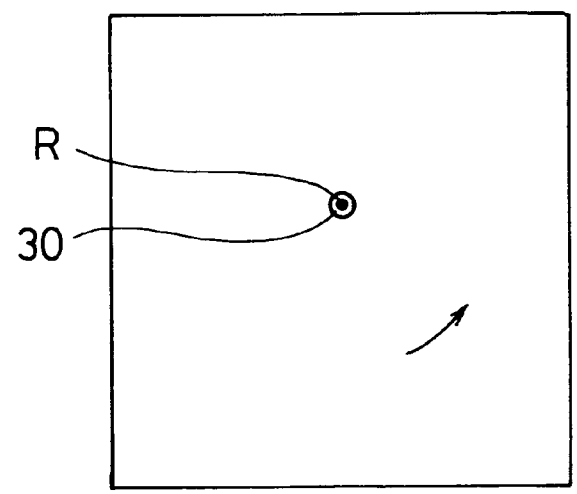

If it is found through the observation that the projection (indicia) 30 of the top cover plate 3 moves (rotates) along a circular locus, the center of rotation R of the top cover plate 3 is deviated from the normal line to the concave surface 3c at the deepest point thereof, as shown in FIG. 7a. If it is found through the observation that the projection (indicia) 30 of the top cover plate 3 is seen substantially as a point (does not move (rotate) along a circular locus), the center of rotation R of the top cover plate 3 is identical to the normal line to the concave surface 3c at the deepest point thereof, as shown in FIG. 7b. Namely, the aligning operation is complete. If the projection (indicia) 30 of the top cover plate 3 moves along a circular locus, the operator stops the rotation of the spindle and strikes the top cover plate 3 using a tool (hammer, etc.) 73 to adjust the position of the top cover plate 3. The adjustment of the position of the top cover plate 3 is repeated until it is observed that the projection 30 of the rotating top cover plate 3 is seen substantially as one point.

When the aligning operation is completed, the operator moves the grinding wheel 74 to bring the same into contact with the rotating top cover plate 3 to thereby grind the outer peripheral surface of the top cover plate 3. The grinding operation ends when the entire outer peripheral surface of the top cover plate 3 is ground by the grinding wheel 74, thus resulting that the distance between the center R of the top cover plate 3 and the entire outer peripheral surface thereof becomes identical. Upon completion of the grinding operation, the center of the configuration of the top cover plate 3 is identical to the normal line to the concave surface 3c at the deepest point of the recess. Thus, the centering operation is finished, and the adjusted top cover plate 3 is obtained.

Process of Formation of Tiltmeter

To produce the tiltmeter, the top cover plate 3, the cylindrical body 2, and the bottom plate 1 are prepared, as mentioned above. The holder 7, the lid 8, and the cover 9 are prepared by cutting an aluminum alloy block into predetermined shapes.

The upper electrodes 4 and 5 are formed on the inner surface of the recess 3c of the top cover plate 3, and the lower electrode 6 is formed on the upper surface 1a of the bottom plate 1, as mentioned above.

The upper surface 1a of the bottom plate 1 and the lower surface 3b of the top cover plate 3 are coaxially adhered to the lower end surface and upper end surface of the cylindrical body 2 by means of an adhesive made of a glass paste, in a liquid-tight fashion, respectively. When the top cover plate 3, the cylindrical body 2, and the bottom plate 1 are registered with each other with reference to the configuration thereof, the axial alignment of these elements can be established, since the aligning operation for the top cover plate 3 has been completed. Consequently, the normal line to the concave surface 3c at the deepest point (center point) of the recess is located on an extension of the central axis of the cylindrical body 2. Thereafter, the electrolytic solution D is introduced in the cylindrical body 2 through an inlet port (not shown) formed in the side wall of the cylindrical body 2. After that, the inlet port is heat-sealed while an appropriate amount of air remains in the cylindrical body 2. The lead wires C are soldered at their one end to the electrodes 4, 5 and 6. Thus, the sealed container "A" is obtained. Note that an air bubble B is formed in the sealed container "A" due to the interfacial tension between the inner surface of the recess 3c and the electrolytic solution D.

Thereafter, the sealed container "A" is placed in the hollow portion of the holder 7 defined by the support posts 7a of the holder 7. Consequently, the top cover plate 3 of the sealed container "A" is stably held on the flanges 7c, so that the cylindrical body 2 and the bottom plate 1 are suspended in the hollow portion of the holder 7. Thus, when the axis L of the holder 7 extends in the vertical direction, the deepest portion of the recess 3c is located at the highest position in the sealed container "A", since the lower surface 3b of the top cover plate 3 lies in a plane parallel with the tangent plane to the concave surface 3c at the deepest point thereof. Therefore, the air bubble B is moved to the deepest portion of the recess 3c.

The sealed container "A" is rotated so that the direction in which the upper electrodes 4 and 5 are juxtaposed, i.e., the direction in which the curvature of the recess 3c is smallest is identical to the detection direction in which the tilt angle is detected. Namely, in FIG. 1, the sealed container "A" is rotated so that the upper electrodes 4 and 5 are juxtaposed in the horizontal direction. When the angular position of the top cover plate 3 relative to the holder 7 is adjusted, the protrusions 4a and 5a of the upper electrodes 4 and 5 are located in spaces defined between the adjacent support posts 7a, so that the upper electrodes 4 and 5 can be insulated from the holder 7.

Thereafter, the O-ring 12 is fitted in the annular groove 8a of the lid 8 and the holder 7 is covered by the lid 8. The spot facing holes 8c of the lid 8 are registered with the threaded holes 7b of the support posts 7a, and thereafter, the screws 13 with flat heads are screwed in the threaded holes 7b through the spot facing holes 8c. When the screws 13 are fastened to the extremity, the O-ring 12 is elastically deformed and is entirely pressed against the upper surface 3a of the top cover plate 3 to thereby press the top cover plate 3 onto the flanges 7c of the holder 7, regardless of the inclination angle of the upper surface 3a of the top cover plate 3. Consequently, the sealed container "A" is firmly connected to the holder 7 in the above-mentioned position. Thus, the tilt sensor is assembled.

According to the embodiment mentioned above, since the top cover plate 3 is provided with the indicia (projection) 30, the centering operation can be easily and quickly carried out. Consequently, the top cover plate can be produced with high efficiency and less labor, thus resulting in an enhanced productivity of the tilt sensor per unit time.

Figure 8A:
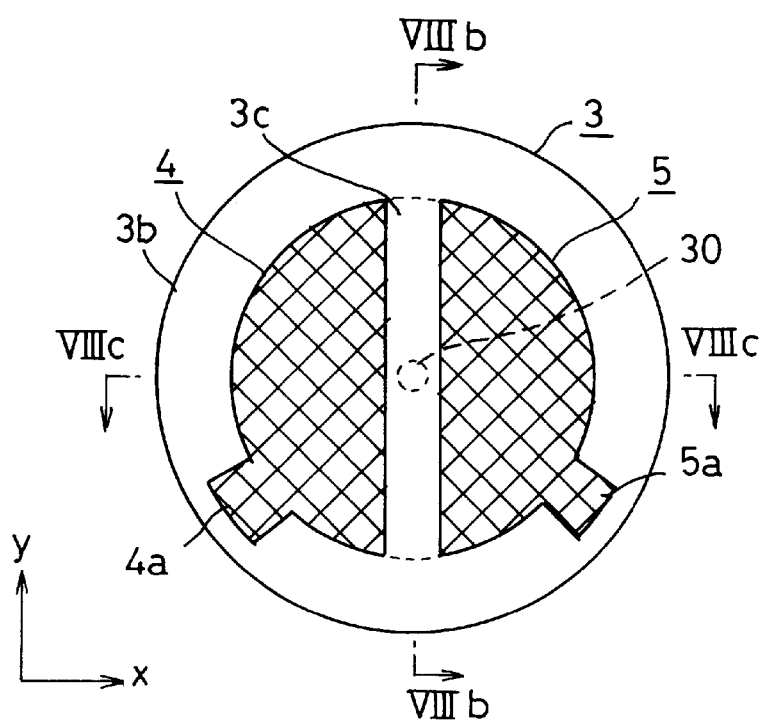
FIGS. 8a, 8b and 8c are a plan view of an embodiment of a top cover plate of a tiltmeter, a sectional view taken along the line VIIIb—VIIIb in FIG. 8a and a sectional view taken along the line VIIIc—VIIIc in FIG. 8a, respectively.
Figure 8B:
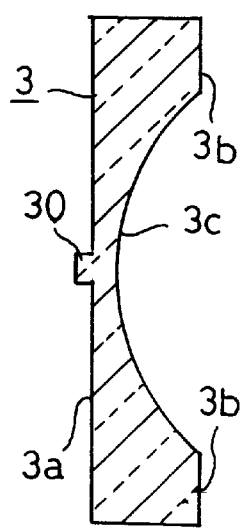
Figure 8C:
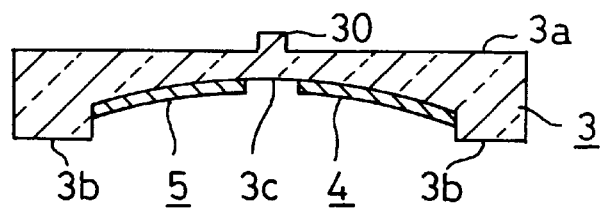

Although the projection (indicia) 30 is provided on the concave surface 3c of the top cover plate 3 and extends toward the inside of the sealed container "A" along the normal line to the concave surface 3c at the deepest point in the illustrated embodiment, it is possible to provide a projection which projects from the upper surface 3a of the top cover plate 3 along the normal line to the concave surface 3c at the deepest point, as shown in FIGS. 8a through 8c. In this alternative, the lower surface 3b or the concave surface 3c of the top cover plate 3 is vacuum-sucked onto the bell chuck 70 during the aligning operation.

Figure 9A:
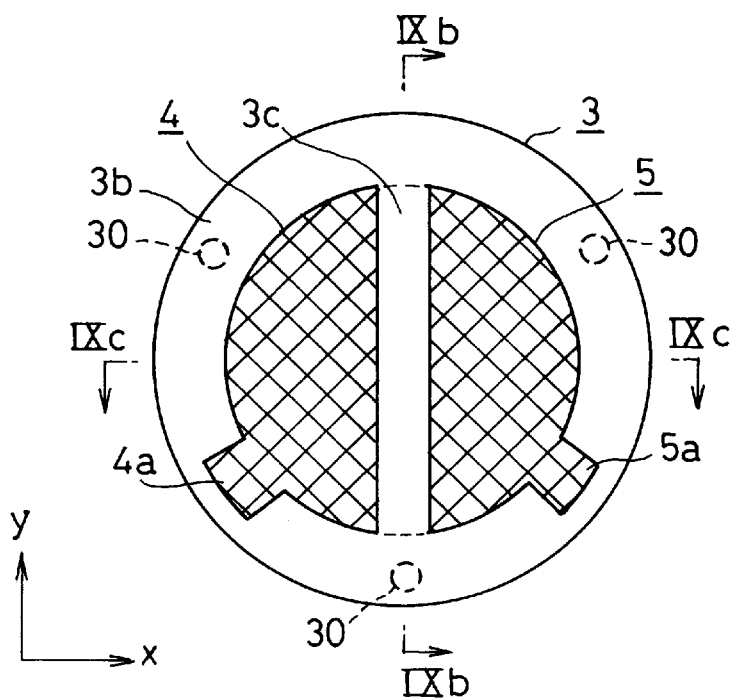
FIGS. 9a, 9b and 9c are a plan view of another embodiment of a top cover plate, a sectional view taken along the line IXb—IXb in FIG. 9a and a sectional view taken along the line IXc—IXc in FIG. 9a, respectively.
Figure 9B:
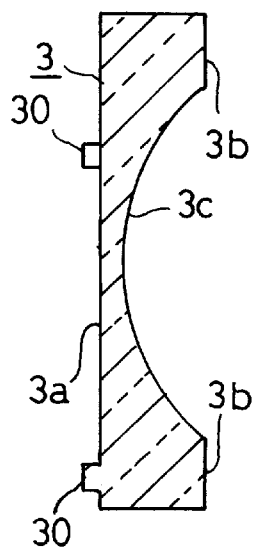
Figure 9C:
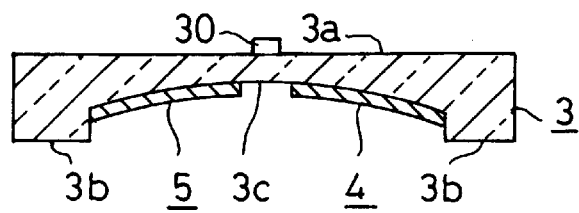
Figure 10A:
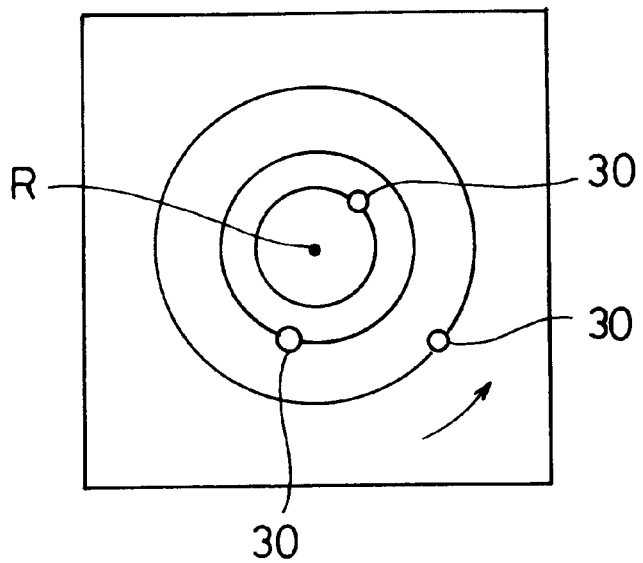
FIGS. 10a and 10b are schematic views showing two different positions of indicia provided on a top cover plate shown in FIGS. 9a through 9c.
Figure 10B:
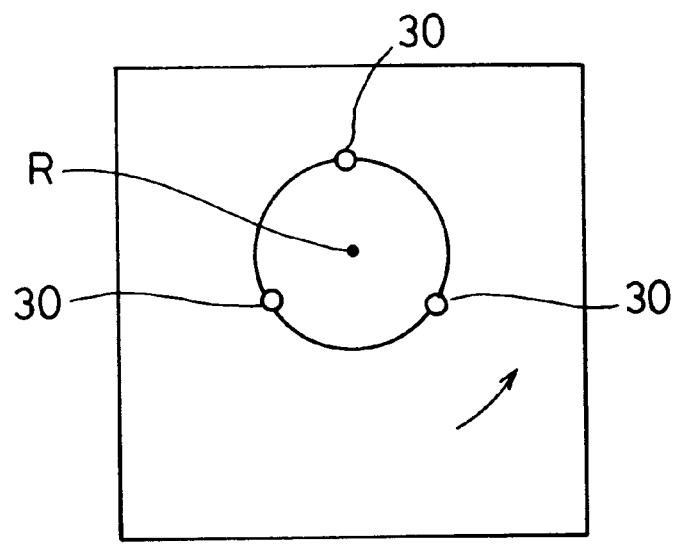

It is alternatively possible to provide three indicia (projections) 30 which are spaced from one another at an equi-angular distance and which are radially spaced from the deepest point of the recess 3c of the top cover plate 3 at an equal distance, on the upper surface 3a of the top cover plate 3, as can be seen in FIGS. 9a through 9c. In this alternative, when it is observed that the projections 30 are moved along different concentric circular loci, no aligning operation is completed, as shown in FIG. 10a. When it is observed that the projections 30 are moved along an identical circular locus, the aligning operation is completed, as shown in FIG. 10b. Also, in this alternative, it is possible to provide the projections 30 on the lower surface 3b of the top cover plate 3.

Furthermore, it is possible to provide two indicia (projections) 30 on the concave surface 3c or the upper surface 3a of the top cover plate 3. The two projections 30 are spaced from the deepest point of the recess at an equi-distance in the direction y perpendicular to the detection direction in which the tilt angle is detected. Moreover, the projection(s) 30 shown in FIGS. 4a through 4c, FIGS. 8a through 8c and FIGS. 9a through 9c can be replaced with a recess or recesses.

Embodiment 2

Figure 11A:
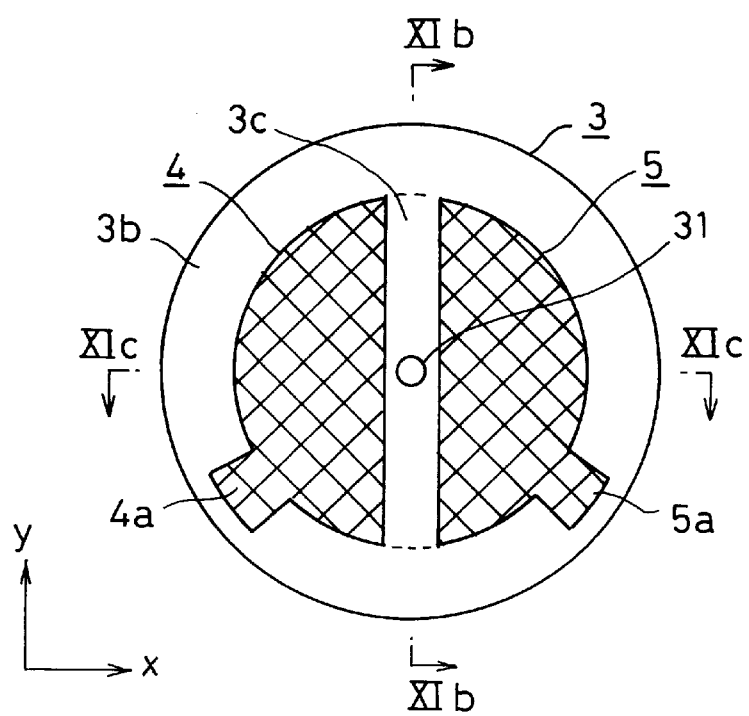
FIGS. 11a, 11b and 11c are a plan view a top cover plate of a tiltmeter of a further embodiment, a sectional view taken along the line XIb—XIb in FIG. 11a and a sectional view taken along the line XIc—XIc in FIG. 11a, respectively.
Figure 11B:
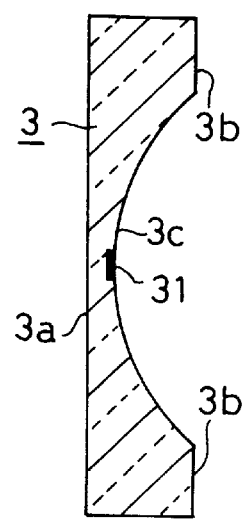
Figure 11C:
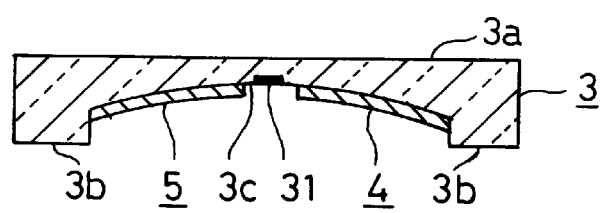

The second embodiment of the present invention will be discussed below. In FIGS. 11a through 11c, the top cover plate 3 is provided with an indicia 31 on the normal line to the concave surface 3c at the deepest point thereof. The indicia 31 is made from a flat surface formed at the deepest portion of the recess (concave surface) 3c.

To form the indicia 31, the molding die (not shown) which is adapted to mold the top cover plate 3 is integrally provided with an extremely small projection (not shown) corresponding to the deepest portion of the recess 3c. Consequently, when the glass preform is molded to form the top cover plate, the flat portion (indicia) 31 is integrally formed on the recess 3c at the deepest portion thereof, by means of the extremely small projection of the molding die which presses the glass preform with higher pressure. Laser beam can pass through the flat indicia 31 while the other portion of the concave surface 3c can not.

The aligning operation for the top cover plate 3 in the second embodiment can be carried out in the same process as that in the first embodiment. Alternatively, it is also possible to execute the aligning operation in the following process.

Figure 12:
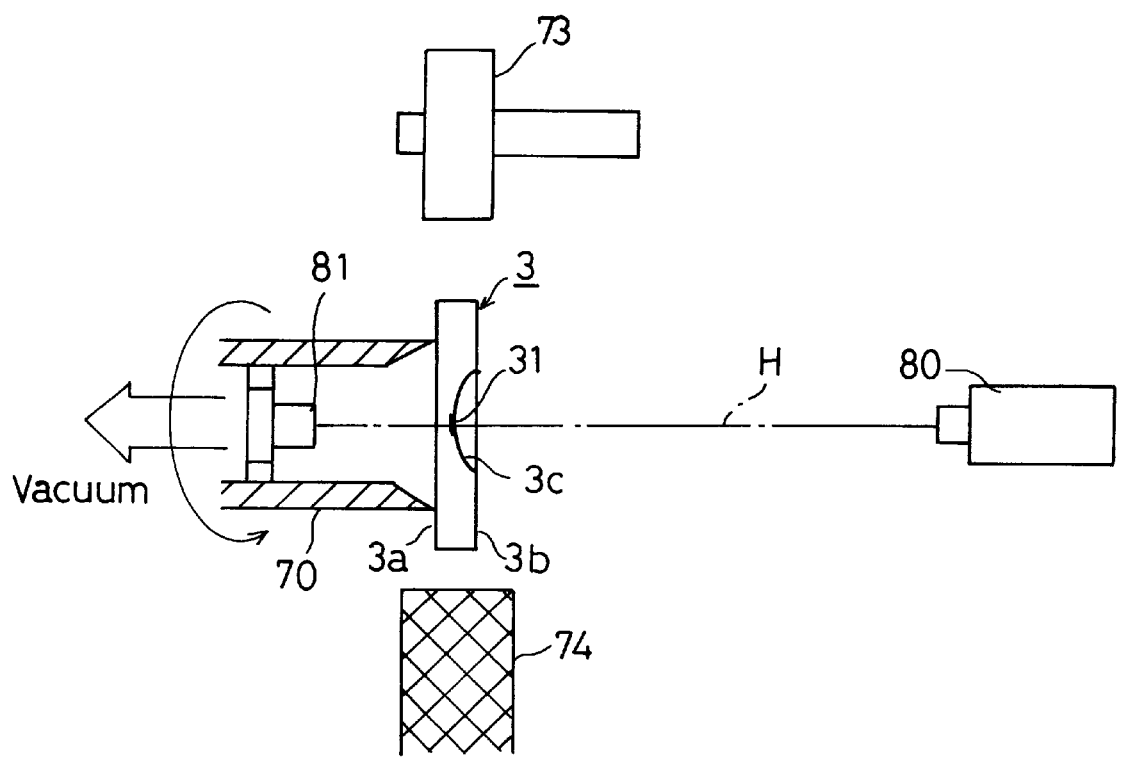
FIG. 12 is a conceptual view of a centering apparatus of a top cover plate shown in FIGS. 11a through 11c.

In a centering apparatus shown in FIG. 12, the bell chuck 70 is identical to the bell chuck 70 shown in FIG. 6. The bell chuck 70 is provided therein with a laser beam receiver 81 on the central axis (center of rotation) thereof. A laser beam emitter 80 is opposed to the laser receiver 81. The laser beam emitter 80 is arranged such that the optical axis H of the laser beam emitted from the laser beam emitter 80 is substantially identical to the axis about which the bell chuck 70 rotates (i.e., the center of rotation of the top cover plate connected to the bell chuck due to the vacuum). The laser beam receiver 81 is connected to an alarm device (not shown) which rings when the laser beam receiver 81 receives the laser beam. The grinding wheel 74 is located in the same arrangement as that shown in FIG. 6. The alarm device can be replaced with an indicating device which indicates information that represents the receipt of the laser beam by the laser beam receiver 81.

In the aligning operation, the operator connects the upper surface 3a of the top cover plate 3 to the front end of the bell chuck 70 using the vacuum sucker. Thereafter, the operator actuates the laser beam emitter 80 to emit the laser beam toward the laser beam receiver 81. If the center of rotation of the top cover plate 3 deviates from the normal line to the concave surface 3c at the deepest point thereof (no aligning is completed), the laser beam is impinged upon the rough surface portion of the concave surface 3c and does not pass through the top cover plate 3. Consequently, no laser beam reaches the laser beam receiver 81.

If the center of rotation of the top cover plate 3 is identical to the normal line to the concave surface 3c at the deepest point thereof (the aligning is complete), the laser beam passes through the top cover plate 3 at the indicia 31 and is received by the laser beam receiver 81. Consequently, the alarm device rings to tell that the laser beam is received by the laser beam receiver 81, i.e., the aligning operation is completed. Namely, the operator repeatedly carries out the adjustment of the position of the top cover plate 3 by striking the same using a hammer 73 until the alarm device rings after the laser beam emitter is actuated to emit the laser beam.

When the aligning operation is completed, the operator stops the operation of the laser beam emitter 81 to thereby stop the emission of the laser beam. Thereafter, the operator rotates the spindle (not shown) connected to the bell chuck 70 to rotate the top cover plate 3 together with the bell chuck 70. When the aligning operation is completed, the operator moves the grinding wheel 74 to bring the same into contact with the rotating top cover plate 3 to thereby grind the outer peripheral surface of the top cover plate 3. The grinding operation ends when the entire outer peripheral surface of the top cover plate 3 is ground by the grinding wheel 74. Upon completion of the grinding operation, the center of the configuration of the top cover plate 3 is identical to the normal line to the concave surface 3c at the deepest point of the recess. Thus, the centering operation is finished.

The structure and assembling operation of the tilt sensor are the same as those in the first embodiment, and hence no duplicate explanation thereof will be given. The technical advantage expected from the second embodiment is substantially the same as that of the first embodiment.

Note that if the lower surface 3b of the top cover plate 3 is entirely formed by a rough surface, the indicia can be made of three flat surface portions formed on the rough lower surface 3b. In this modified arrangement, the flat surface portions are spaced from one another at an equiangular distance and from the center of the recess 3c of the top cover plate 3 at an equal distance as the indicia 30 in the embodiment shown in FIGS. 9a through 9c. A diverging light source is provided in the bell chuck 70 of the centering apparatus in the first embodiment, so that the rotating top cover plate 3 can be viewed through an aligning telescope 72 which is opposed to the front end of the bell chuck 70 to carry out the aligning operation.

As can be understood from the above discussion, according to the present invention, since whether or not the centering of the top plate is complete can be detected in accordance with the state of the rotation of the indicia, the centering operation of the top cover plate can be easily and quickly carried out.

What is claimed is:

1. A tilt sensor having a sealed container, said container comprising a container body, a top cover plate adapted to close said container body and provided on one end surface thereof with a concave surface whose depth gradually increases from a peripheral edge toward a center thereof, and a liquid enclosure containing an air bubble, enclosed in said container body, wherein an indicia, provided on a line normal to said concave surface at a deepest point thereof, is used during an alignment operation to make a center of rotation of said top cover plate coincident with said line normal to said concave surface at said deepest point thereof.

2. A tilt sensor according to claim 1, wherein said indicia is formed on said concave surface of said top cover plate.

3. A tilt sensor according to claim 1, wherein said indicia is formed on a surface of said top cover plate that is located away from said concave surface.

4. A tilt sensor according to claim 1, wherein said indicia is made of a projection provided on said top cover plate.

5. A tilt sensor according to claim 1, wherein said indicia is made of a recess provided on said top cover plate.

6. A tilt sensor according to claim 1, wherein said concave surface is formed by a rough surface, and wherein said indicia is made of a flat surface portion formed on said concave surface.

7. A tilt sensor according to claim 1, wherein an outer peripheral edge of said concave surface is defined by a circle.

8. A tilt sensor according to claim 7, wherein a center of said circle defining said outer peripheral edge of said concave surface is located on said line normal to said concave surface at said deepest point of the recess.

9. A tilt sensor having a sealed container, said container comprising a container body, a top cover plate adapted to close said container body and provided on one end surface thereof with a concave surface whose depth gradually increases from a peripheral edge toward a center thereof, and a liquid enclosure containing an air bubble, enclosed in said container body, wherein a plurality of indicia, provided on said top cover plate which are radially spaced from a deepest point of a recess at an equal distance, are used during an alignment operation to make a center of rotation of said top cover plate coincident with said plurality of indicia.

10. A tilt sensor according to claim 9, wherein said indicia are formed on said concave surface of said top cover plate.

11. A tilt sensor according to claim 9, wherein said indicia are formed on a surface of said top cover plate that is located away from the concave surface.

12. A tilt sensor according to claim 9, wherein said indicia are made of projections provided on said top cover plate.

13. A tilt sensor according to claim 9, wherein said indicia are made of recesses provided on said top cover plate.

14. A tilt sensor according to claim 9, wherein said concave surface is formed by a rough surface, and wherein said indicia are made of flat surface portions formed on said concave surface.

15. A tilt sensor according to claim 9, wherein an outer peripheral edge of said concave surface is defined by a circle.

16. A tilt sensor according to claim 15, wherein a center of a circle defining said outer peripheral edge of said concave surface is located on a line normal to said concave surface at said deepest point of said recess.

17. A top cover plate for a tilt sensor adapted to close a container body of a sealed container in which a liquid containing an air bubble is enclosed, said top cover plate being provided with a concave surface whose depth gradually increases from an outer peripheral edge toward a center of said top cover plate, wherein said top cover plate comprises an indicia located on a line normal to said concave surface at a deepest point thereof that is used during an alignment operation to make a center of rotation of said top cover plate coincident with said line normal to said concave surface at said deepest point thereof.

18. A top cover plate for a tilt sensor adapted to close a container body of a sealed container in which a liquid containing an air bubble is enclosed, said top cover plate being provided with a concave surface whose depth gradually increases from an outer peripheral edge toward a center of said top cover plate, wherein said top cover plate comprises a plurality of indicia radially spaced from said deepest point of a recess at an equal distance that are used during an alignment operation to make a center of rotation of said top cover plate coincident with said plurality of indicia.

19. A tilt sensor having a sealed container, said container comprising a container body, a top cover plate adapted to close said container body and provided on one end surface thereof with a concave surface whose depth gradually increases from a peripheral edge toward a center of said top cover plate, and a liquid enclosure containing an air bubble, enclosed in said container body, wherein said top cover plate is provided with an indicia whose position does not change when said top cover plate is rotated about a line normal to said concave surface at a deepest point of said recess after an alignment operation is performed.

20. A tilt sensor having a sealed container, said container comprising a container body, a top cover plate adapted to close said container body and provided on one end surface thereof with a concave surface whose depth gradually increases from a peripheral edge toward a center of said top cover plate, and a liquid enclosure containing an air bubble, enclosed in said container body, wherein said top cover plate is provided with a plurality of indicia whose distance from a line normal to said concave surface at a deepest point of said concave surface does not change when said top cover plate is rotated about said normal line after an alignment operation is performed.

* * * * *